(12) United States Patent
Muller et al.

(10) Patent No.: US 7,890,885 B2
(45) Date of Patent: Feb. 15, 2011

(54) CONTENT NAVIGATIONAL SHORTCUTS FOR PORTAL ENVIRONMENTS

(75) Inventors: Michael Muller, Medford, MA (US); Corinne M. Ryan, Westford, MA (US); Michael Chi Hung Wu, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/465,844

(22) Filed: Aug. 21, 2006

(65) Prior Publication Data

US 2008/0046541 A1 Feb. 21, 2008

(51) Int. Cl.
G06F 3/048 (2006.01)

(52) U.S. Cl. ........................ 715/808; 715/760

(58) Field of Classification Search .............. 707/5, 707/3, 9; 709/204, 217; 717/173; 382/100; 705/2; 715/808, 760
See application file for complete search history.

(56) References Cited

U.S. PATENT DOCUMENTS

| | | | |
|---|---|---|---|
| 6,836,773 B2 | 12/2004 | Tamayo et al. | |
| 6,985,898 B1* | 1/2006 | Ripley et al. | 707/5 |
| 2003/0014485 A1* | 1/2003 | Banatwala | 709/204 |
| 2004/0044747 A1* | 3/2004 | Trevor et al. | 709/217 |
| 2004/0078224 A1* | 4/2004 | Schramm-Apple et al. | 705/2 |
| 2006/0004763 A1* | 1/2006 | Horvitz et al. | 707/9 |
| 2006/0294077 A1* | 12/2006 | Bluhm et al. | 707/3 |
| 2007/0022419 A1* | 1/2007 | Subbarao et al. | 717/173 |
| 2007/0165904 A1* | 7/2007 | Nudd et al. | 382/100 |

OTHER PUBLICATIONS

Beier et al., "Quick Links", Sep. 28, 2003, Oracle, pp. 1-6.*
Lunt, P.; TeamSite Gets a Facelift; Web Content Management Software; 2003; INSPEC; AN-8137148.
Priebe, T., et al; Towards Integrative Enterprise Knowledge Portals, 2003; IEEE/ACM Digital Library.
Kotzinos, D., et al; Online Curriculum on the Semantic Web; The CSD-UoC Portal for Peer-to-Peer E-learning; 2005; ACM Digital Library.
Diaz, O., et al; Improving Portlet Interoperability Through Deep Annotation; 2005; ACM Digital Library.
Pierce, M., et al; Interoperieble Web Services for Computational Portals; 2002; ACM Digital Library.

* cited by examiner

*Primary Examiner*—Le Luu
(74) *Attorney, Agent, or Firm*—Carey Rodriguez Greenberg Paul

(57) ABSTRACT

Embodiments of the present invention address deficiencies of the art in respect to user interface navigation and provide a method, system and computer program product for content navigational shortcuts for portal environments. In one embodiment of the invention, a content navigational shortcut method can be provided. The method can include associating anchors with corresponding user interface elements in a markup language defined display. The method further can include listing references to a subset of the user interface elements in a quicklink list in the markup language defined display. Finally, the method can include setting focus in the markup language defined display to a corresponding one of the user interface elements at an associated one of the anchors in response to an activation of one of the references in the quicklink list.

13 Claims, 3 Drawing Sheets

CONTENT NAVIGATIONAL SHORTCUTS FOR PORTAL ENVIRONMENTS

BACKGROUND OF THE INVENTION

1. Field of the Invention

The present invention relates to accessible user interface elements in a computer program and more particularly to accessible content navigation in a portal environment.

2. Description of the Related Art

Prior to the popularization of the Internet and the subsequent implementation of the World Wide Web ("the Web"), software publishers typically distributed computer applications via storage media such as a computer diskette or compact disc. Initially, such stand-alone computer applications included underlying program logic, data storage and, optionally, a user interface. Recently, given the popularization of the Internet and the Web, it is no longer reasonable to presume that computer applications are distributed exclusively via disk medium. Rather, in many cases, conventional computer programs are distributed electronically via the Internet.

In many cases computer applications are no longer distributed as stand-alone executable programs. Rather, many computer applications are distributed as markup language specified, browser based applications which can include a collection of hypermedia documents such as Web pages which can be viewed in hypermedia content browsers such as Web browsers. In the case of a markup language specified computer program, users can interact with the underlying program logic not through a traditional GUI, but through a GUI provided by GUI elements embedded in a hypermedia document displayed in a content browser.

Conventional markup can specify a user interface and corresponding logic which can be processed and rendered through use of a content browser. Content browsers process display attributes embedded in markup to properly format content also contained within the markup. Notable variants of the content browser include the venerable Web browser, as well as the more recent extensible markup language (XML) browser. Regardless of the type of browser, all conventional markup processors are preconfigured to parse and interpret attribute tags embedded in markup.

A user interface defined by plain content in a markup language can be simplistic in nature and traversing the content of an ordinary Web page can be of no consequence in most circumstances. Portal environments are known to incorporate several pages within a single view such that navigating a portal page can be substantially more challenging than an ordinary Web page. For the uninitiated, a portal environment is a dynamic aggregation of separate markup language specified pages into a single unified page.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

Navigation in a portlet can be tedious for those who use a keyboard or screen reader. In the case where multiple user interface objects have been positioned within a portlet, an interacting end user cannot jump quickly to a frequently desired user interface object. Rather, the end user first must tab through the predecessor elements to the desired object in order to reach the desired object. If the focus is with a successor object "past" the desired object, the end user first must backwards tab. Even more challenging, where an object includes multiple points of focus such as in the case of a table, and where an end user desires focus with a particular point in the object, the end user first must tab through the different points of focus in the object, or revert to navigating to the starting point of focus before tabbing to the desired point of focus in the object.

For many end users, a frequented object in a portlet can be personal in nature. In this regard, whereas one end user may frequently interact with one user interface object in a portlet, another end user may frequently interact with a completely different user interface object in the portlet. Current navigation solutions for portlet displays represent all of objects in the portlet as uniform in desirability irrespective of the personal preferences of any one end user. Accordingly, end users often will be left with no choice other than to tediously navigate to a desired object in a conventional manner.

BRIEF SUMMARY OF THE INVENTION

Embodiments of the present invention address deficiencies of the art in respect to user interface navigation and provide a novel and non-obvious method, system and computer program product for content navigational shortcuts for portal environments. In one embodiment of the invention, a content navigational shortcut method can be provided. The method can include associating anchors with corresponding user interface elements in a markup language defined display. The method further can include listing references to a subset of the user interface elements in a quicklink list in the markup language defined display. Finally, the method can include setting focus in the markup language defined display to a corresponding one of the user interface elements at an associated one of the anchors in response to an activation of one of the references in the quicklink list.

In one aspect of the invention, the method further can include incorporating an add quicklink option to the quicklink list, and, responsive to an activation of the add quicklink option, adding a reference to a new user interface element in the quicklink list in the markup language defined display. In this regard, adding a reference to a new user interface element in the quicklink list in the markup language defined display can include listing all available user interface elements in a listing, and adding references to the quicklink list to all selected user interface elements in the listing. Alternatively, adding a reference to a new user interface element in the quicklink list in the markup language defined display can include detecting a user interface element having focus, and adding a reference to the detected user interface element in the quicklink list in the markup language defined display.

In another embodiment of the invention, a content navigational shortcut data processing system can be provided. The system can include user interface elements disposed in a markup language defined user interface, such as a portlet in a portal page. The system also can include corresponding anchors, each anchor corresponding to one of the user interface elements. Notably, a quicklink list can be disposed in the markup language defined user interface. The quicklink list can include a reference to one of the user interface elements. The quicklink list further can be coupled to quicklink logic. The logic can include program code enabled to set focus to the one of the user interface elements in the markup language defined user interface responsive to an activation of the reference.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for content navigational shortcuts in a portal environment. In accordance with an embodiment of the present invention, anchors can be assigned to corresponding user interface elements in a portlet within the portal environment. A quick link list can associate selected ones of the anchors with references to corresponding ones of the user interface elements. In response to the activation of a reference to user interface element in the quick link list, focus in the portlet can change to the corresponding user interface element associated with the activated reference. In this way, navigational efficiencies can be realized in the portal user interface.

Figure 1A:
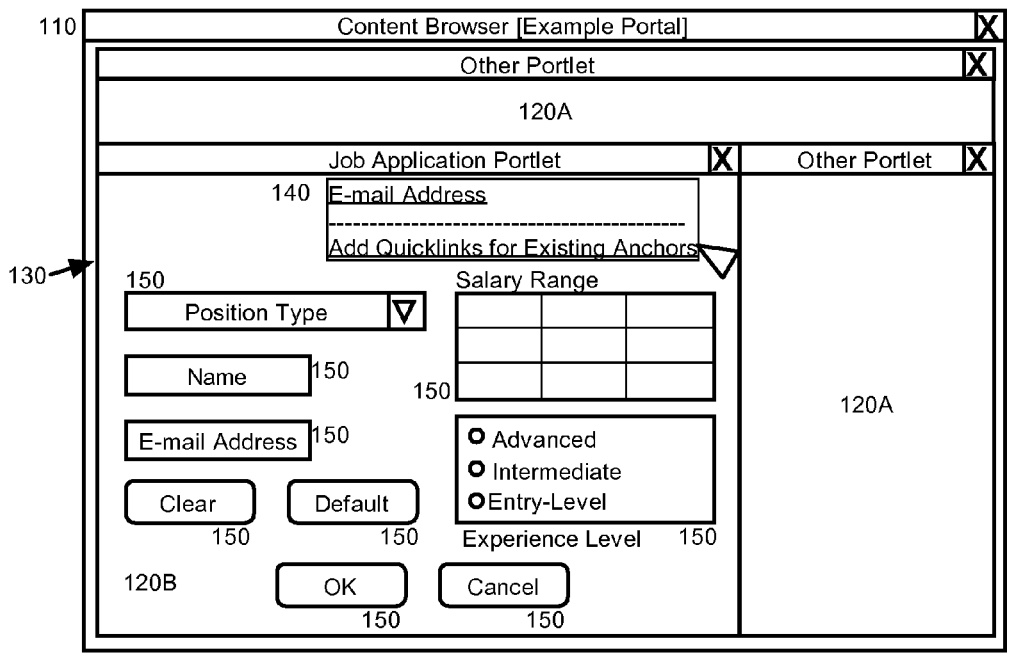
FIGS. 1A and 1B, taken together, are screen shots of an exemplary portal user interface illustrating a portal configuration with content navigational shortcuts.
Figure 1B:
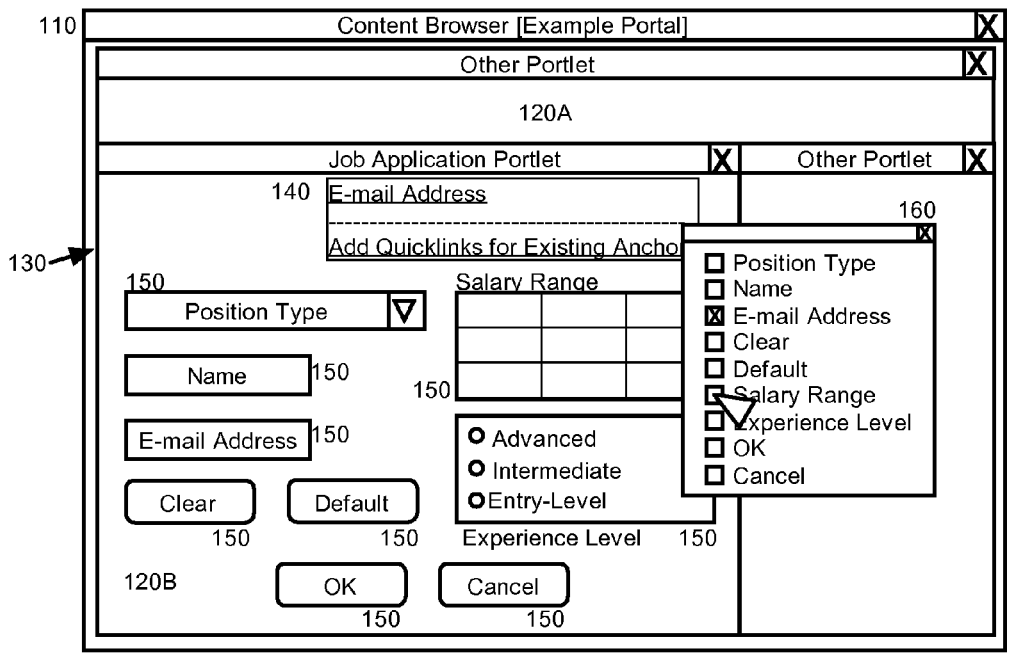

In illustration, FIGS. 1A and 1B, taken together, are screen shots of an exemplary portal user interface illustrating a portal configuration with content navigational shortcuts. As shown in FIG. 1A, a content browser 110 can display multiple portlets 120A, 120B in a portal environment 130. In a selected one of the portlets 120B, namely a job application portlet as shown in FIGS. 1A and 1B, multiple user interface elements 150 can be rendered, including text fields, drop down lists, buttons, radio button fields and tables, to name only a few. Focus can be provided for any of the user interface elements 150. As well, focus can be provided internally to any of the user interface elements 150 such as in the case of a table where focus can be established on a table cell by table cell basis.

A quicklink user interface element 140 can be disposed in the portlet 120B. The quicklink user interface element 140 can include a listing of available quicklinks and an option to add additional quicklinks for availability in the quicklink user interface element 140. Responsive to the activation of an available quicklink in the quicklink user interface element 140, focus can be shifted within the portlet 120B to one of the user interface elements 150 associated with the activated available quicklink in the quicklink user interface element 140.

As shown in FIG. 1B, responsive to the activation of the add additional quicklinks option in the quicklink user interface element 140, an add quicklinks list 160 can be displayed. The add quicklinks list 160 can include a listing of references to user interface elements 150 that have corresponding anchors and that are enabled for addition to the quicklinks user interface element 140. The selection of one or more references to user interface elements 150 can result in the addition of those references to the quicklink user interface element 150 as available quicklinks. It is to be recognized, however, that the mode of adding new available quicklinks to the quicklink user interface element 140 is not limited to the mechanism illustrated in FIG. 1B and other modes can suffice.

Figure 2A:
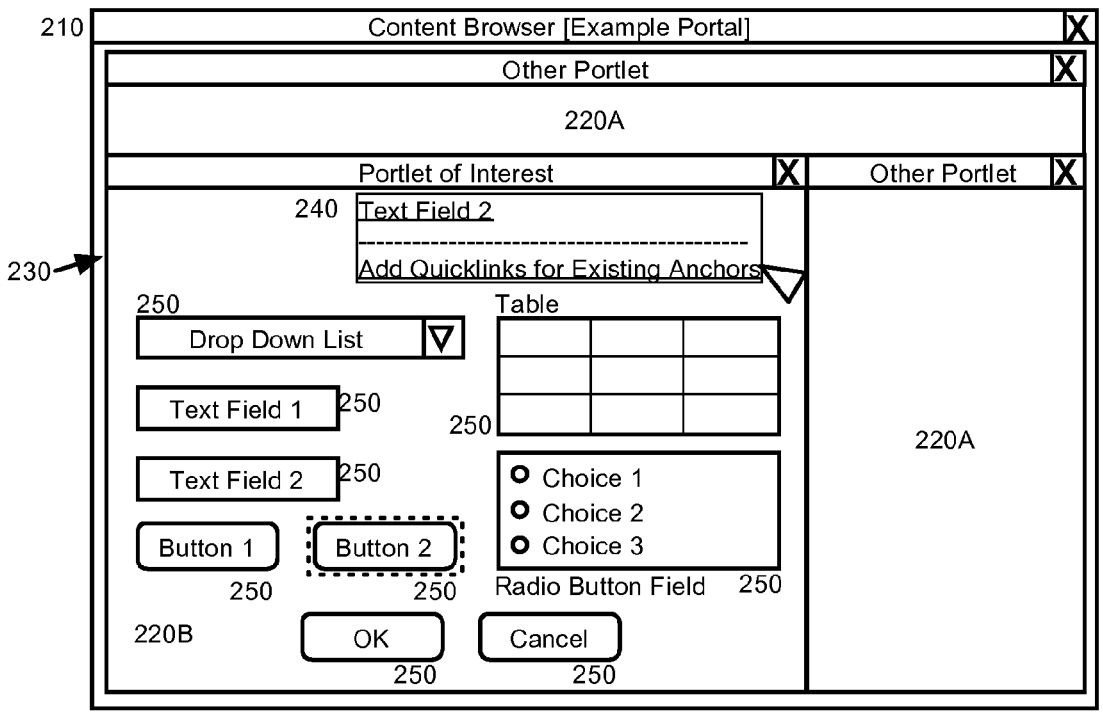
FIGS. 2A and 2B, taken together, are screen shots of another exemplary portal user interface illustrating a portal configuration with content navigational shortcuts.
Figure 2B:
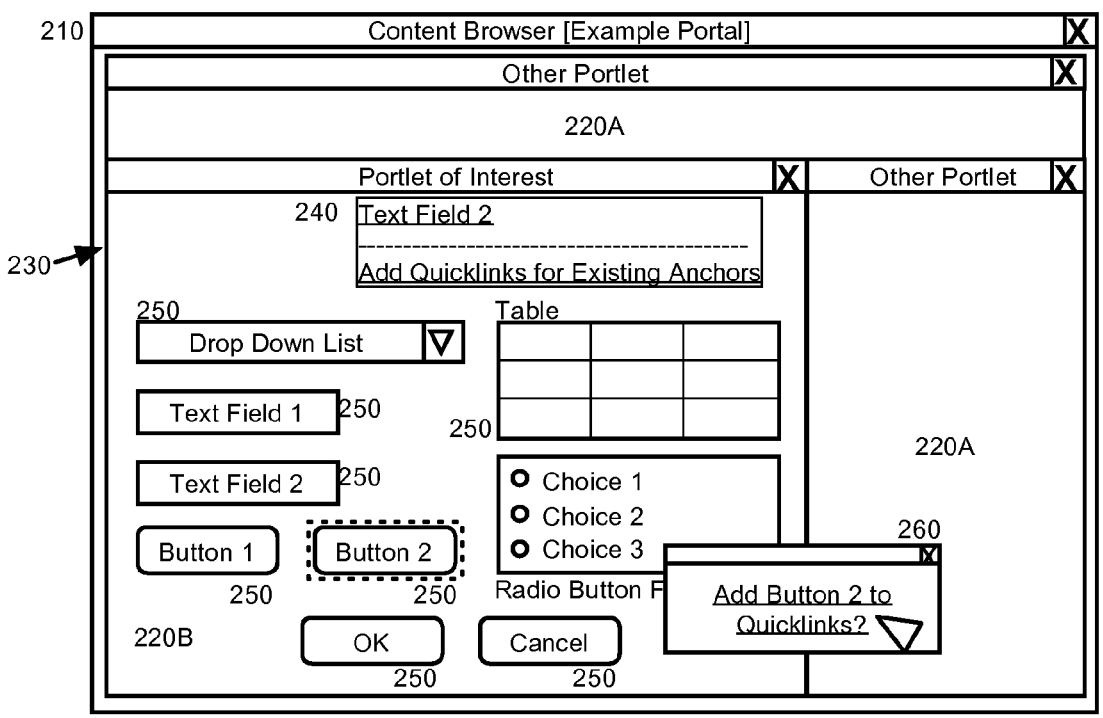

For example, FIGS. 2A and 2B, taken together, are screen shots of another more generically depicted, exemplary portal user interface illustrating a portal configuration with content navigational shortcuts. As shown in FIG. 2A, a content browser 210 can display multiple portlets 220A, 220B in a portal environment 230. In a selected one of the portlets 220B, multiple user interface elements 250 can be rendered, including text fields, drop down lists, buttons, radio button fields and tables, to name only a few. Focus can be provided for any of the user interface elements 250. As well, focus can be provided internally to any of the user interface elements 250 such as in the case of a table where focus can be established on a table cell by table cell basis.

A quicklink user interface element 240 can be disposed in the portlet 220B. The quicklink user interface element 240 can include a listing of available quicklinks and an option to add additional quicklinks for availability in the quicklink user interface element 240. Responsive to the activation of an available quicklink in the quicklink user interface element 240, focus can be shifted within the portlet 220B to one of the user interface elements 250 associated with the activated available quicklink in the quicklink user interface element 240.

As shown in FIG. 2B, responsive to the activation of the add additional quicklinks option in the quicklink user interface element 240, an add quicklinks dialog 260 can be displayed. The add quicklinks dialog 260 can query the end user whether the end user intends to add the user interface element 250 with focus to the list of available quicklinks in the quicklink user interface element 250. The confirmation of the query in the add quicklinks dialog 260 can result in the addition of a reference to the user interface element 250 with focus to the quicklink user interface element 250 as an available quicklink.

Figure 3:
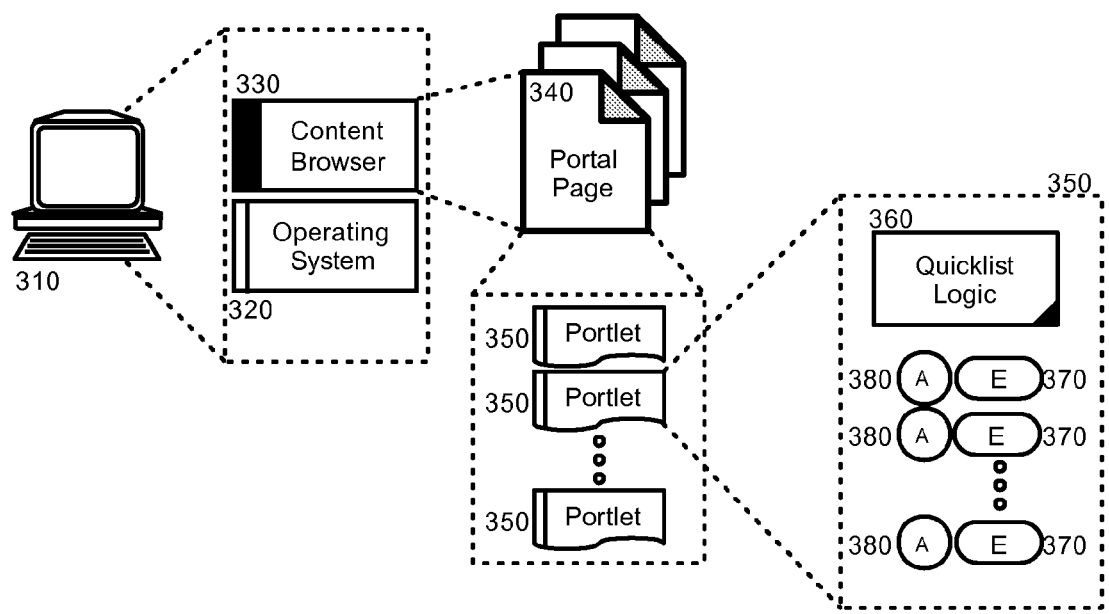
FIG. 3 is a schematic illustration of a portal rendering data processing system configured for content navigation shortcut processing; and, FIG. 4 is a flow chart illustrating a process for managing content navigation shortcuts in a portal environment.

A data processing system can be provided to support the operational functionality shown in FIGS. 1A and 1B and in FIGS. 2A and 2B. In this regard, FIG. 3 is a schematic illustration of a portal rendering data processing system configured for content navigation shortcut processing. As shown in FIG. 3, a computing platform 310 can include an operating system 320 sufficient to support the operation of a content browser 330. The content browser 330 further can include a configuration sufficient to support the operation of one or more portal pages 340 for a portal environment, wherein each of the portal pages can include one or more markup language defined portlets 350.

The portlets 350 can include a multiplicity of user interface elements 370 including text fields, drop down lists, buttons, radio button fields and tables, to name only a few. Each of the user interface elements 370 can include a corresponding anchor reference 380 such that focus can be switched to any of the user interface elements 370 by reference to its corresponding one of the anchor references 380. Finally, quicklist logic 360 can be provided. The quicklist logic 360 can include program code enabled to selectively add references to individual ones of the user interface elements 370 and to process the activation of any one of the added references to support a change of focus to a corresponding one of the user interface elements 370.

Figure 4:
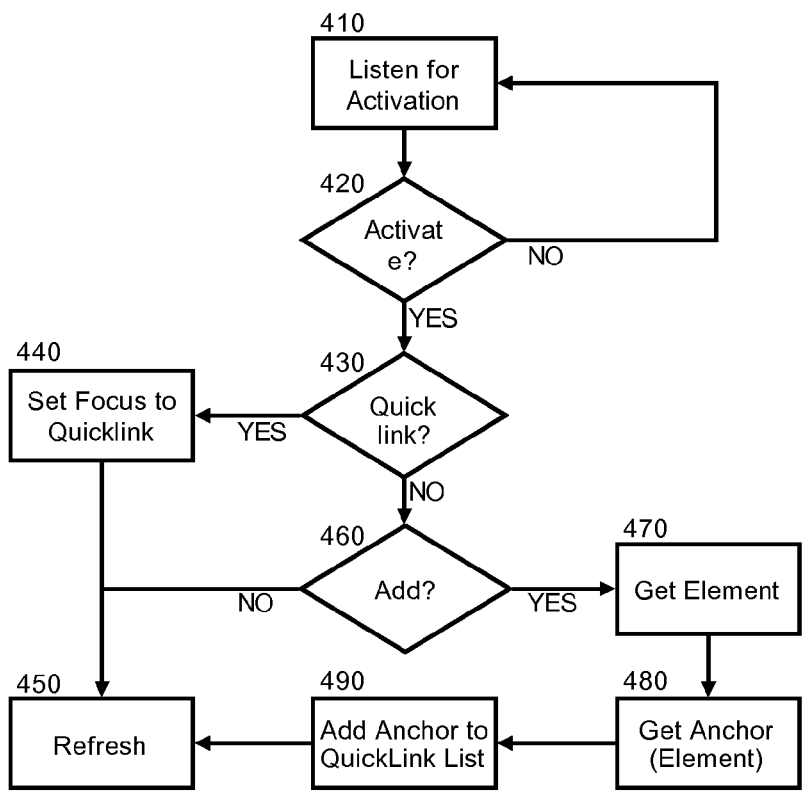

In yet further illustration of the operation of the quicklist logic, FIG. 4 is a flow chart illustrating a process for managing content navigation shortcuts in a portal environment. Beginning in block 410, the process can listen for the activation of the quicklist logic. In decision block 420, if the quicklist logic becomes activated, in decision block 430, it can be determined whether a jump to quicklink option has been activated, or in decision block 460 whether and add quicklink option has been activated. In the former circumstance, in block 440 focus can be set in the portlet to the user interface element associated with the jump to quicklink option.

In the latter circumstance, in block 470 a user interface element can be selected. The selection can be a manual selection by an end user from among a list of user interface elements. Alternatively, the selection can be automated and can include, for instance, the determination that the user interface element having focus is to be added as a jump to quicklink option. In either circumstance, in block 480, an anchor reference for the selected user interface element can be obtained and in block 490 the anchor can be added to the quicklink list as a jump to quicklink option. Finally, in block 450 the portlet can be refreshed for viewing by the end user.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A content navigational shortcut method comprising:
    associating a plurality of anchors with corresponding user interface elements in a markup language defined display of a content browser executing in a computing platform with processor and memory;
    listing references to a subset of the user interface elements in a quicklink list in the markup language defined display; and,
    responsive to an activation of one of the references in the quicklink list, setting focus in the markup language defined display to a corresponding one of the user interface elements at an associated one of the anchors.

2. The method of claim 1, further comprising:
    incorporating an add quicklink option to the quicklink list; and,
    responsive to an activation of the add quicklink option, adding a reference to a new user interface element in the quicklink list in the markup language defined display.

3. The method of claim 1, wherein adding a reference to a new user interface element in the quicklink list in the markup language defined display, comprises:
    listing all available user interface elements in a listing; and,
    adding references to the quicklink list to all selected user interface elements in the listing.

4. The method of claim 1, wherein adding a reference to a new user interface element in the quicklink list in the markup language defined display, comprises:
    detecting a user interface element having focus; and,
    adding a reference to the detected user interface element in the quicklink list in the markup language defined display.

5. The method of claim 1, wherein associating a plurality of anchors with corresponding user interface elements in a markup language defined display, further comprises associating an anchor with a portion of a corresponding user interface elements in a markup language defined display.

6. A content navigational shortcut data processing system comprising:
    a computing platform comprising an operating system executing in memory of the computing platform and supporting a content browser operating in the operating system;
    a plurality of user interface elements disposed in a markup language defined user interface displayed in the content browser;
    a plurality of anchors, each anchor corresponding to one of the user interface elements; and,
    a quicklink list disposed in the markup language defined user interface, the quicklink list comprising a reference to one of the user interface elements, the quicklink list being coupled to quicklink logic comprising program code enabled to set focus to the one of the user interface elements in the markup language defined user interface responsive to an activation of the reference.

7. The system of claim 6, wherein the quicklink list further comprises an add to quicklink list option, the add to quicklink option is coupled to the quicklink logic and the quicklink logic further comprises program code enabled to add a new reference to the quicklink list.

8. The system of claim 6, wherein the markup language defined user interface is a portlet in a portal page.

9. A computer program product comprising a computer usable medium having computer usable program code for managing content navigational shortcuts, the computer program product including:
- computer usable program code for associating a plurality of anchors with corresponding user interface elements in a markup language defined display;
- computer usable program code for listing references to a subset of the user interface elements in a quicklink list in the markup language defined display; and,
- computer usable program code for responsive to an activation of one of the references in the quicklink list, setting focus in the markup language defined display to a corresponding one of the user interface elements at an associated one of the anchors.

10. The computer program product of claim 9, further comprising:
- computer usable program code for incorporating an add quicklink option to the quicklink list; and,
- computer usable program code for adding a reference to a new user interface element in the quicklink list in the markup language defined display responsive to an activation of the add quicklink option.

11. The computer program product of claim 9, wherein the computer usable program code for adding a reference to a new user interface element in the quicklink list in the markup language defined display, comprises:
- computer usable program code for listing all available user interface elements in a listing; and,
- computer usable program code for adding references to the quicklink list to all selected user interface elements in the listing.

12. The computer program product of claim 9, wherein the computer usable program code for adding a reference to a new user interface element in the quicklink list in the markup language defined display, comprises:
- computer usable program code for detecting a user interface element having focus; and,
- computer usable program code for adding a reference to the detected user interface element in the quicklink list in the markup language defined display.

13. The computer program product of claim 9, wherein the computer usable program code for associating a plurality of anchors with corresponding user interface elements in a markup language defined display, further comprises computer usable program code for associating an anchor with a portion of a corresponding user interface elements in a markup language defined display.

\* \* \* \* \*